Patented Aug. 12, 1941

2,252,427

UNITED STATES PATENT OFFICE 2,252,427

METHOD OF PRODUCING SIZED CERAMIC PRODUCTS

Earnest T. Hermann, El Segundo, Calif.

No Drawing. Application January 19, 1939, Serial No. 251,796

5 Claims. (Cl. 25—156)

This application is a continuation-in-part of my copending application Serial No. 746,309, filed October 1, 1934, and pertains to an advantageous product comprising sized discrete partly or completely vitrified ceramic particles, and to a method of producing such particles.

The principal object of the present invention is to provide a commercially economic method of producing discrete ceramic particles.

A particular object of the present invention is to provide for important economies in the production of sized ceramic particles, whereby particles of a substantially uniform size may be produced as a finished ceramic product.

A further object of the invention is to provide a sized ceramic product, the individual ceramic particles being characterized by a plastic-molded appearance over the principal proportions of their surface area, and by a fractured appearance over a minor proportion of their surface area.

Ceramic particles may be produced according to the present invention by subjecting a plastic argillaceous body to a subdividing operation or treatment whereby discrete particles of substantially uniform size, in at least one and preferably in at least two dimensions, are obtained, and these discrete particles of argillaceous material are then subjected to a burning or firing operation whereby each of the particles is reduced to a partly or wholly vitrified discrete ceramic unit. In its preferred application, the method of the present invention is carried out in such manner that the plastic particles obtained by the subdivision of the plastic argillaceous body are of such size as to have, after having been shrunken during the subsequent firing operation, at least one and preferably two dimensions substantially equivalent to or preferably slightly less than the screen opening through which the material is to be passed in a screening operation.

The sized particles produced according to the present invention may be employed to advantage in a number of applications to the building trades, such as, for example, a body of material in the production of acoustical blocks as set forth in my issued United States Letters Patent No. 1,929,425, or, as further examples, as a surfacing material for coating waterproof roofing materials or the like, as a filtration medium, as a heat insulation medium, or as a support for catalytic agents. In the formation of a body material useful in the production of acoustical blocks, the particles may be formed as elongated shavings or cuttings, fired, and then subsequently crushed to size or, the cuttings may be made relatively long and filamentary, fired and used without further crushing, if a body having a high proportion of voids is desired. In the production of a material for use as a filtration medium, the individual particles may be formed in a filamentary shape or may be formed into shavings of irregular length and of substantially uniform cross-section, which may be subsequently crushed to the desired particle size. In this connection the particles may be so formed as to have a cross-section somewhat within the range of particle dimension which is ultimately desired, and the subsequent crushing operation will serve to reduce the length of the particles so that the desired screen mesh is obtained. Thus a number of various screen sizes may be effectively produced at a low cost for use in building up filter beds for gravity filtration or the like.

One of the particular objects of the present invention is to provide for the production of a sized ceramic product, in which the principal proportion of the energy and effort required to reduce the base material to the desired size is expended upon the material when it is in a plastic or semi-plastic state, whereby considerable economy in such size reduction operation is effected. For example, when a material such as a burned clay is reduced to a definite screen size, such as 8 mesh, through the medium of crushing rolls or the like, a very considerable proportion of the material is reduced to a fineness materially smaller than desired. As a specific example, with reference to the use of sized granules for a roofing material, the granule-size specifications of one of the largest roofing material manufacturers in this country is as follows:

| | |
|---|---|
| − 8 mesh | Minimum 100% |
| − 8 mesh +10 mesh | Minimum __ maximum 3% |
| −10 mesh +14 mesh | Minimum 25% maximum 40% |
| −14 mesh +20 mesh | Minimum 30% maximum 45% |
| −20 mesh +28 mesh | Minimum 20% maximum 30% |
| −28 mesh +35 mesh | Minimum 5% maximum 10% |
| −35 mesh +pan | Minimum __ maximum 2½% |

The following typical analysis of crushed rock obtained by the use of crushing rolls to reduce the material to minus 8 mesh, as given by the W. S. Tyler Company, Cleveland, Ohio, manufacturers of screens and screening apparatus, may be compared with the above specification for roofing granules:

SCREEN ANALYSIS

| −8 mesh +35 mesh portion | Per cent | −35 mesh portion | Per cent |
|---|---|---|---|
| −8+10 mesh | 14 | −35+48 mesh | 7 |
| −10+14 mesh | 12 | −48+65 mesh | 6 |
| −14+20 mesh | 10 | −65+100 mesh | 6.5 |
| −20+28 mesh | 11 | −100+150 mesh | 4 |
| −28+35 mesh | 10 | −150+200 mesh | 3.5 |
| Total | 57 | −200 mesh | 16 |
| | | Total | 43 |

It is apparent therefore that the relatively coarse material crushed to a size specification required for roofing will contain practically 40% of material which is too fine to pass the specification, and this material must necessarily be discarded. As above pointed out, the present invention contemplates subdividing a plastic or semi-plastic argillaceous mix so that at least one and preferably two of the dimensions of the subdivided particles approximate the mesh size of the largest particles required, so that the crushing operation necessary to reduce the material to the required screen specification is very light, and consists principally in reducing the third dimension of the particles. This sort of crushing produces a relatively small quantity of fines and requires a relatively small energy expenditure.

A further object of the invention is to provide a method of producing sized ceramic particles involving the step of subdividing a plastic or semi-plastic argillaceous body, and a firing operation which combines the steps of drying and calcining the particles formed in the subdivision step.

Other objects of the invention will be apparent from the following description of the invention, or will be specifically pointed out therein.

The sized ceramic product of the present invention may advantageously be produced by a practice of the present method in an apparatus of the type shown and described in my copending application Serial No. 746,309, filed October 1, 1934, or in any apparatus adapted to plastically subdivide a plastic mass of argillaceous material. As described in the above-mentioned copending application, a movable blade assembly is caused to pass over the face of a block of plastic argillaceous material, producing a plurality of filamentary particles each time a cutting blade member passes over the face of the block. The plasticity of the argillaceous body should be such as to produce discrete particles which would not plastically interbond upon contact with one another after formation, wherefore the once-formed particles will retain their individual characteristics during the subsequent drying and firing operations. The discrete argillaceous particles may be passed directly into a firing zone, as is specifically provided for in the above-mentioned apparatus shown in my copending application, or may be allowed to dry and be subsequently fired. The degree of firing to which the particles are subjected will be governed by the ceramic properties of the plastic clay from which the particles are formed, as will be apparent to those skilled in the ceramic art. Firing temperatures of from 1800° to 2600° F. have been found useful.

As a specific example of the practise of the present method, a semiplastic mass of argillaceous material such as a plastic clay, containing from 15 to 25 per cent water, is prepared (variation in water content being relied upon to control the plasticity of the argillaceous material, it being appreciated that clays of different inherent plasticity will require different percentages of water to exhibit equivalent plastic properties) and placed in position to be acted upon by the movable cutting blade assembly, in the production of discrete filamentary argillaceous particles, as more fully described in my above-mentioned copending application Serial No. 746,309. The produced particles are then passed to a drying stage, or, if desired, passed directly to a firing zone where they are converted into discrete ceramic particles. The length of the filamentary particles may readily be controlled by selection of the degree of plasticity of the argillaceous body from which the particles are formed. Particles have been produced according to this process which range from one-quarter inch or more in cross-section to as small as .004 inch in one cross-sectional dimension. The length of the filamentary particles may readily be controlled between an inch or more to as little as $\tfrac{1}{16}$ inch.

The operation by which the particles are plastically formed, either by a cutting, shaving, or extruding procedure, will result in particles having an exterior appearance which clearly indicates the method of plastic subdivision employed. For example, when the particles are formed by a serrated cutting blade, in the production of ribbon-like particles, the sides of the particles will exhibit the knife marks resulting from ununiformities in the cutting edge, and in view of the fact that for the most part (that is, only except where the particles are formed in the very first pass of the cutting blade over the face of the plastic body) each particle will have at least one face which has been in direct contact with the cutting blade when the particle was formed, and another face which was formed in the previous pass by a cutting blade. These two faces are of significantly different appearance, the latter face being significantly roughened and wrinkled due to the actual compression and plastic deformation of the particle as the particle is severed from the plastic body. The first-mentioned face is consistently smoother in appearance than the last-mentioned face. Furthermore, the edges of the particle will generally exhibit a serrated appearance, due to the rupturing action of the cutting blade members in severing the particle from the main body.

The characteristic exterior appearance of the particles after the plastic subdivision operation persists through the firing operation in which they are converted into discrete ceramic particles. When the particles are subsequently subjected to the light crushing operation relied upon to effect the desired reduction of the particle size thereof, the particles will for the most part be fractured along lines extending transversely of the length of the particles, resulting in the production of discrete ceramic bodies or particles which exhibit a "fractured" appearance on two opposite sides or ends, and a plastically molded appearance on the remaining surfaces.

The particles are preferably so formed in the plastic subdivision step that one and preferably two dimensions thereof correspond to the desired ultimate particle dimensions, and the third dimension is formed materially greater than the desired ultimate dimension, due allowance being made for shrinkage during the firing operation.

Where a material is to pass an 8 mesh screen, for example, the light ribbons or shavings should be formed approximately .09" or .1" in width and thickness so that after the firing shrinkage has taken place the width and thickness of these particles will be somewhat less than 0.093", which is the size of the opening in an 8 mesh standard screen. After firing only a light crushing treatment is necessary to reduce the particles to proper lengths and provides the desired third dimension of the particles.

If desired, petroleum coke or other carbonaceous material may be incorporated in the plastic clay mix before formation of the particles, either with or without a material adapted to assist in oxidation of such carbonaceous material, such as iron oxide or the like, so that during the firing operation the particles will become bloated due to the formation of a gaseous material within the particles. Particles formed in this manner would be valuable as a light-weight heat and sound insulating material, for use as a filler in wall partitions of buildings, or the like, in absorption processes, or as a carrier or matrix for catalytic agents. The advantage of forming light-weight particles in the above-described manner, by liberation of a gas within the particle, over the formation of bloated masses of material which must subsequently be crushed to the desired particle size lies principally in the fact that the surface of the relatively small particles is well sealed by fusion which closes the principal proportion of the gas cells which cause the bloating, so that a relatively small percentage of exposed cells is presented by the particles. Thus particles may be provided which contain a high percentage of interior voids while presenting a substantially continuous or uniform exterior surface. The exterior of the particles is quite uniformly subjected to the action of the combustion gases and even though a slight crushing operation is employed following the vitrification step, the principal proportion of the surface of such particles will be "surface vitrified" while if relatively large bodies of comparable material were vitrified and then subsequently subjected to a crushing operation, a very small proportion of the particles would have any "surface vitrified" faces.

As a further distinguishing characteristic of the novel discrete particles produced by the method of the present invention, it is to be pointed out that the firing operation, which follows the plastic subdivision operation, results in substantially uniform exterior vitrification of the particles and the fractures resulting from the subsequent light crushing operation which is practised to reduce the third dimension of the particles after firing have the appearance of "fresh" fractures and are recognizably different in appearance from surfaces which may have been formed by fracture prior to the firing operation. This difference in appearance arises from the action of heat upon the exterior surface of the particles, causing incipient fusion or partial vitrification of the fine grain particles present in the surface of the unfired fracture, softening the edges of the constituent grains of the particle, while the surfaces formed by fracturing after firing have a crisp, clear-cut appearance resulting from the fresh, sharp edges of the constituent grains which have not been subjected to the direct application of heat. Particles fired at relatively high temperatures exhibit this difference to an increasing degree, as the vitrification of the particle is increased.

It will be further appreciated that substantially any desired coloring materials may be incorporated in the plastic mix whereby the finished particles will have a desired color, whereby the materials may be made more desirable for use as surfacing materials for roofing paper and the like.

While I have described the subdividing of the plastic argillaceous body, to form discrete particles of suitable size, as being effected by shaving or slicing the same from the surface of a block of argillaceous material, as more fully shown and described in Serial No. 746,309, it will be understood that the particles may, if desired, be formed by extrusion of plastic argillaceous material of suitable consistency through one or more orifices, as more fully described in my issued patents Nos. 2,087,973 and 2,095,252, the orifice or orifices being of such size and shape as to produce particles of a size and shape suitable for the purposes of the present invention.

The fired filamentary particles may be employed in industry and the arts in the absence of a light final crushing operation to reduce the length of the particles in the production of a fully "sized" product. Such uses include the production of acoustical building materials, filtration media and the like, as more fully set forth above, and for this reason the present method is directed to the production of discrete ceramic particles which are "sized" in but one or two cross-sectional dimensions, as well as discrete particles which are "sized" in all three dimensions.

I claim:

1. The method of forming sized ceramic particles, which comprises: preparing a plastic mass of argillaceous material; subjecting said mass to a shaving operation whereby discrete particles are produced which have at least one dimension approximating the desired size of particle and at least one dimension greater than the desired size; subjecting the discrete particles thus formed to a firing operation to cause an at least partial vitrification thereof to form discrete ceramic particles; and subjecting said ceramic particles to a size reducing operation whereby said particles are reduced to approximately the desired size.

2. The method of forming sized ceramic particles, which comprises: preparing a plastic mass of argillaceous material; subjecting said mass to a shaving operation whereby discrete particles are produced which have two dimensions approximating the desired size of particle and a third dimension greater than the desired size; subjecting the discrete particles thus formed to a firing operation to cause an at least partial vitrification thereof to form discrete ceramic particles; and subjecting said ceramic particles to a size reducing operation whereby said third dimension of said particles is reduced to approximately the desired size.

3. The method of forming sized ceramic particles which comprises: forming a plastic mass of argillaceous material; subjecting said mass to a shaving operation to form a plurality of discrete plastic particles of filamentary shape having at least two dimensions approximating the size of particle desired and a third dimension greater than the desired size; subjecting said plastic particles to a firing operation to cause an at least partial vitrification thereof and form discrete ceramic particles therefrom; subjecting said ceramic particles to a crushing operation whereby said third dimension of said particles is reduced to approximately the desired size.

4. The method of forming sized ceramic particles which comprises: forming a plastic mass of argillaceous material; subjecting said mass to a shaving operation to form a plurality of discrete plastic particles of filamentary shape having at least one dimension approximating the size of particle desired and at least one dimension greater than the desired size; subjecting said plastic particles to a firing operation to cause an at least partial vitrification thereof and form discrete ceramic particles therefrom; and subjecting said ceramic particles to a crushing operation whereby said particles are reduced to approximately the desired size.

5. The method of forming discrete ceramic particles, which comprises: forming a plastic mass of argillaceous material into a body; subjecting said body to a shaving operation to form a plurality of elongated discrete particles of such argillaceous material; and subjecting the discrete particles so formed to a firing operation to cause an at least partial vitrification thereof and convert the same to discrete ceramic particles.

EARNEST T. HERMANN.